Nov. 10, 1942.  D. R. JONES ET AL  2,301,912
MANUFACTURE OF TRINITRORESORCIN
Filed Sept. 23, 1939
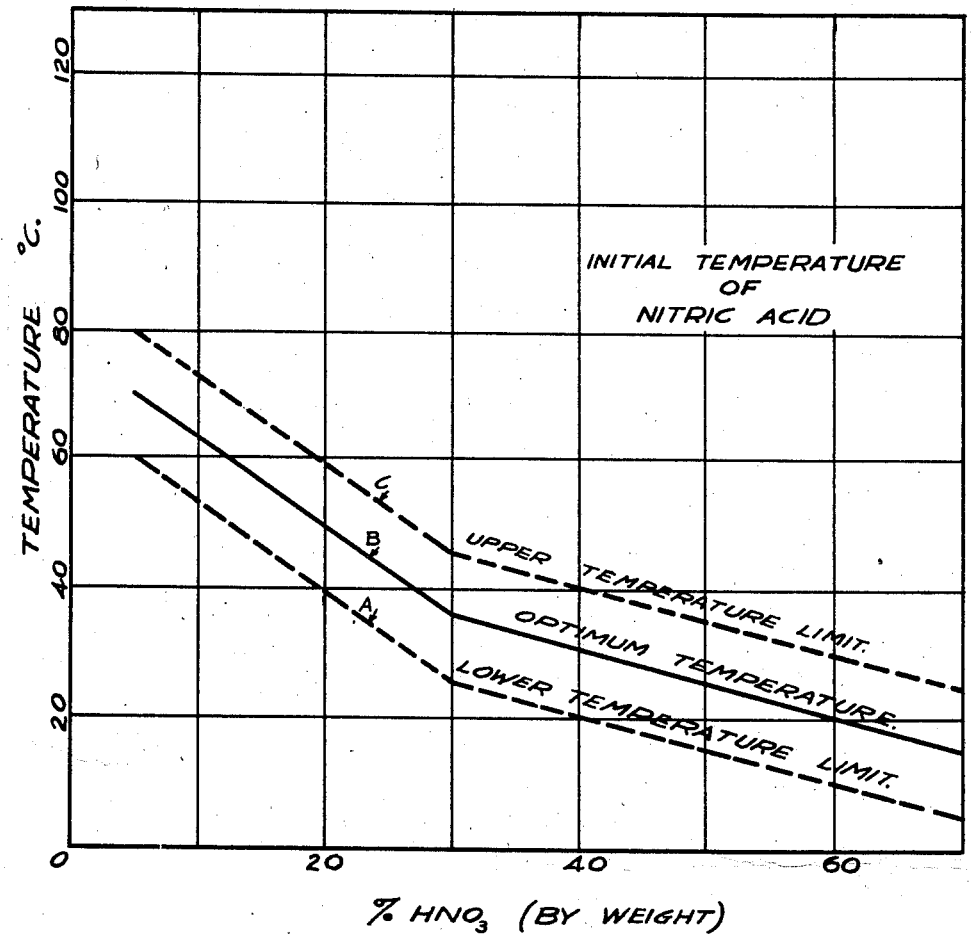
INVENTORS
DELBERT R. JONES
& CARL L. ROBERTS
BY
ATTORNEY

UNITED STATES PATENT OFFICE 2,301,912

MANUFACTURE OF TRINITRORESORCIN

Delbert R. Jones, East Alton, and Carl L. Roberts, Wood River, Ill., assignors to Western Cartridge Company, East Alton, Ill., a corporation of Delaware Application September 23, 1939, Serial No. 296,250

7 Claims. (Cl. 260—622)

This invention pertains to a new and improved process for the manufacture of trinitroresorcin.

Trinitroresorcin, generally termed styphnic acid, has been extensively utilized in explosive compositions, particularly in the form of its normal and basic lead salts. Its manufacture heretofore has involved the conversion of resorcin by means of concentrated sulfuric acid to resorcin di-sulfonic acid and subsequent treatment of the sulfonation mixture with concentrated nitric acid. Such procedures have been attended by disadvantageous features, including the necessity for carrying out the reactions in highly concentrated acid solution, the obtainment of yields considerably below theoretical, and the unavoidable accumulation of large amounts of spent acid from the reaction, the treatment of which for either recovery or disposal has required additional operations and expense. Furthermore, difficulty has been encountered in the production of trinitroresorcin which readily yields suitable crystalline salts.

It is an object of this invention to provide a process for the manufacture of trinitroresorcin by means of which the accumulation of spent reaction liquid containing considerable amounts of acid may be avoided.

Another object of this invention is to provide a practical and economical process for the manufacture of trinitroresorcin wherein dinitrosoresorcin serves as an intermediate.

A further object is to provide a process of this type whereby trinitroresorcin particularly adapted for the preparation of suitable crystalline salts may be obtained.

Another object of this invention is to provide a process of this type whereby the use of concentrated acid solutions may be avoided.

Other objects will appear from the following description.

We have found that relatively pure trinitroresorcin (hereinafter abbreviated as T. N. R.) may conveniently be obtained in high yields by reacting dinitrosoresorcin (hereinafter abbreviated as D. N. R.) with nitric acid under conditions as specified below, and that with the observance of suitable precautions, the resulting T. N. R. is well suited for conversion to crystalline salts. Although it was noted by Fitz in 1875 (Berichte, vol. 8, page 633) during attempts to oxidize dinitroso- to dinitroresorcin, that trinitroresorcin was formed when nitric acid was tried as the oxidizing agent, it appears that useful conditions for applying the reaction to the manufacture of T. N. R. have remained unrealized heretofore and the marked advantages of such a procedure entirely unappreciated.

The change whereby D. N. R. is converted to T. N. R. by reaction with nitric acid involves the introduction of a nitro group into the ring and the oxidation of the two nitroso groups to nitro groups, and may be represented theoretically by the following chemical equation:

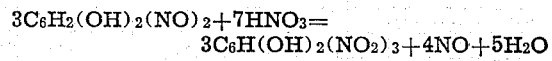

We have found that wide variations, depending on the conditions employed, exist in the rate and extent of reaction as well as in the yield and quality of product which result when D. N. R. is treated with nitric acid. By extensive investigation, we have established conditions of treatment whereby the reaction may be successfully utilized. We have found that for securing a readily controllable reaction and good yields of desired product, amounting to at least 80% of the theoretical, it is essential that the initial reaction temperature be adjusted in accordance with the concentration of the acid solution being used. That is, an initial reaction temperature should be provided which for any given acid concentration is above a minimum temperature or within a definite range therefor. When the procedure involves the admixture of all the D. N. R. and the nitric acid at the start of the reaction, the optimum initial temperature was observed to be higher the weaker the acid solution, increasing linearly with decreasing acid concentration along two intersecting straight lines extending from 15° C. for 70% acid to 35° C. for 30% acid, and from this latter point to 70° C. for 5% acid. It may be noted, however, that satisfactory results may be secured with the use of initial temperatures within about 10° C. of the optimum. These initial temperature-concentration lines are illustrated in the appended drawing.

At temperatures substantially lower than the optimum values above indicated, the reaction rate is too slow for practical use and, in addition, the action is incomplete even after extended treatment. Thus, in the case of 10% acid, for which the indicated useful temperatures are above about 50° C., a very slow action was found to occur at 30° C. and about three-fourths of the D. N. R. remained unconverted even after treatment at this temperature for five days.

A procedure in which the reagents are premixed at such low temperatures, and the mixture then heated to reactive temperature has been found impractical due to the formation under such conditions of excessive volumes of a persistent foam. The head space which would be required in the reaction vessel for the practice of such a procedure would be so large relative to the volume of the charge as to render it prohibitive for practical use.

Initial temperatures substantially higher than those indicated above are less suited when the D. N. R. is all added at the start of the reaction, since the reaction then sets in at an inconvenient rate, with rapid evolution of large volumes of gaseous oxides of nitrogen. Since the permissible reaction rate depends to some extent on the size of the batch under treatment as well as on the type and relative size of the reaction vessel employed, it should be understood that an initial temperature somewhat higher than indicated above may at times be suitable. Furthermore, initial reaction temperatures substantially higher than those indicated may at times be employed with advantage when the D. N. R. is added portion-wise to the acid solution and each increment is allowed to react, at least partially, before further addition.

We have found it preferable to employ at least about three mols of nitric acid per mol of D. N. R. in the reaction mixture, that is, a substantial excess of nitric acid over the proportion expressed in the equation given above. The use of smaller proportions leads to generally unsatisfactory products which are contaminated with excessive amounts of D. N. R. and dark-colored by-products.

The results of these studies may be summarized by stating that good yields of T. N. R. of a grade suitable for most purposes, such as for direct use in explosive compositions, may be obtained by mixing D. N. R. with a 5%–70% by weight nitric acid solution in a ratio of at least 3 mols of nitric acid per mol of D. N. R., using an initial reaction temperature adjusted to be above a point increasing linearly with decreasing acid concentration from 5° C. for 70% acid to 25° C. for 30% acid to 60° C. for 5% acid, and then continuing the agitation of the mixture until the action has been completed, i. e. to the point of substantial cessation of gas evolution. For any treatment within these conditions, a product of improved purity may be secured by completing the treatment at a temperature substantially higher than the initial reaction temperature. It is accordingly preferable to permit the temperature of the reaction mixture to rise as a result of the heat evolved by the reaction and to complete the treatment at least 10° or 20° C., by supplying heat if necessary, above the initial temperature. It is further to be understood that high initial temperatures may be used with advantage when the D. N. R. is added gradually to the acid solution.

The T. N. R. resulting from the practice of the above conditions is generally colored a dark brown due to the presence of by-products, and contains an amount of residual D. N. R. which varies according to the specific treatment employed.

Further advantage results when more than five mols of nitric acid per mol of D. N. R. are used in the reaction mixture or the treatment is completed at a temperature above about 80° C. The observance of both these precautions is essential when it is desired that the T. N. R. be produced not only in high yields but in addition that it be of light color or readily adapted for conversion to crystalline salts. The final temperature may be carried up to the boiling point of the solution, if desired, or higher by carrying out the final treatment under pressure. Observance of these conditions leads to the further unexpected advantage that the reaction liquid containing unconsumed nitric acid, which is obtained on separation of the T. N. R., is of light color and may be re-used directly in the manufacture of subsequent batches. This enables the avoidance of any accumulation of spent acid and also the production of T. N. R. with the consumption in the oxidation-nitration reaction of only about 3–4 mols of nitric acid per mol of T. N. R. produced.

The presence of T. N. R. of small amounts of D. N. R. and of substances such as nitroresorufin, which may form during the successive nitrosation and nitration of resorcin is at times desirable in that the production of suitable crystals of salts such as of normal and basic lead trinitroresorcinates is enabled thereby. However, excessive amounts of these substances interfere with the production of desired salt crystals, tending instead to cause the precipitation of very small particles or crystals. In particular, the presence of more than about 0.3% of D. N. R. in T. N. R. has been found excessive in this respect. Within the above-specified limits of treatment, however, the resulting T. N. R. is well suited for the preparation of crystalline salts of desired crystal size and form, having a D. N. R. content substantially less than 0.3% down to a trace thereof.

The principles of our improved process will perhaps be best understood by reference to the following illustrative examples.

*Example I*

Twenty-two hundred grams of resorcinol and 2260 grams of 95% sulfuric acid were dissolved in 80 liters of water at room temperature, 75 pounds of crushed ice were added, and the mixture was agitated in a suitable vessel until the temperature was about −2° C. A solution of 3000 grams of sodium nitrite in 16 liters of water was then added gradually during 30 minutes, agitation being continued and the temperature maintained below about +5° C. After further agitation for 15 minutes to complete the nitrosation reaction, the precipitated D. N. R. monohydrate was filtered and washed with water.

The moist filter cake, containing about 30% solid and 70% water, was then mixed with 15 liters of a 40% by weight solution of nitric acid contained in a jacketed vessel maintained at 30° C. Reaction started immediately with brisk evolution of nitrogen oxides, accompanied by formation of foam, which subsided after about five minutes. The temperature of the reaction mixture was then raised to about 95° C. in 30 minutes by supplying heat to the jacket, and maintained at that point for about 30 minutes, evolution of gas continuing during the initial heating period and gradually decreasing toward the completion of the treatment. While continuing the agitation, cooling water was passed through the jacket until the mixture was at 25° C. The precipitated T. N. R. was then filtered and washed, first with 2% nitric acid solution and finally with water. It was finally air-dried at about 50° C., the yield corresponding to 90–95% of the theoretical, based on the resorcin used.

The product consisted of pale yellow crystals, with melting point (corrected) of 172–174° C. and was found to be substantially free from D. N. R. and suitable for use in the preparation of crystalline salts. The T. N. R. appeared particularly adapted for the preparation of the basic lead salt, larger crystals being obtainable than with commercial T. N. R. of 175° C. melting point, prepared by the sulfonation and nitration of resorcin.

A 20% by weight nitric acid solution was obtained as the filtrate from the T. N. R. and was subsequently utilized, after being brought to a strength of about 40% by weight nitric acid by the addition of concentrated acid, for production of T. N. R. as in this example. This procedure may be repeated indefinitely, requiring for each cycle only the addition of sufficient fresh concentrated nitric acid to replace that consumed in the reaction and lost in washing the product. The nitric acid consumed in this way amounted to about 3.5 mols per mol of T. N. R. produced.

The above example is representative of procedures in which the D. N. R. is all added at once to the nitric acid solution, the temperature of the latter being adjusted in accordance with the acid concentration as previously described.

*Example II*

The moist filter cake of D. N. R. monohydrate, obtained for example as described in Example I, was added over a period of a half hour to 35 liters of an 18% by weight aqueous nitric acid solution which was well agitated and maintained at 60° C. in a suitable vessel. During this period, 5 liters of 70% nitric acid were added to maintain the strength at about 18% by weight. The temperature of the reaction mixture was then raised to 100° C. in ten minutes and maintained at that point for fifteen minutes. After cooling the T. N. R. slurry to 25° C. in a half hour while stirring, the product was filtered, washed, and dried.

The T. N. R. was obtained at about 90% of the theoretical yield and consisted of a coarse granular free-flowing non-dusting product, light yellow in color. It was shown by test to have a low D. N. R. content and capable of yielding crystalline lead salts of desirable properties. Basic lead trinitroresorcinate was produced therefrom at substantially higher yields than were obtainable with T. N. R. produced by sulfonation and nitration. The handling characteristics of the present product were likewise found to offer significant improvement, because of the free-flowing and non-dusting qualities, over T. N. R. of the prior art.

The mother liquor obtained on filtration of the T. N. R. was found suitable for re-use in the process directly as obtained, its acid concentration being at the desired value.

This example is representative of a procedure which on the whole presents the greatest advantages for practical use, involving the provision of a 10%–35% nitric acid solution at a temperature above about 50° C., the gradual addition thereto of D. N. R. and sufficient concentrated acid to maintain the strength at the original value, and completion of the treatment at above 80° C.

*Example III*

Moist D. N. R. monohydrate containing 67% water, was added over a period of twenty minutes to a 70% nitric acid solution initially at 20° C. to result in a reaction mixture containing 5 mols of $HNO_3$ per mol of D. N. R. at a concentration of 38% by weight nitric acid. The temperature was raised to 80° C. and was maintained between 80° and 90° C. for a half hour during continuous agitation, the D. N. R. dissolving and T. N. R. being precipitated during the course of the reaction. After cooling, filtering, washing and drying, a yield amounting to 90% of the theoretical of coarse, free-flowing, non-dusting T. N. R. crystals and crystal aggregates was obtained. The product had an orange-yellow color, and was found on test to have a low D. N. R. content and well suited for the preparation of crystalline salts.

*Example IV*

Moist D. N. R. monohydrate containing 60% water was added to 70% nitric acid solution at 20° C., forming a reaction mixture containing 5 mols of $HNO_3$ per mol of D. N. R. Reaction ensued immediately with steady evolution of nitrogen oxide fumes. While continuing agitation, the temperature was raised to the boiling point and the mixture maintained at that point for 30 minutes. After cooling, filtering, washing and drying, a yellow T. N. R. having a melting point of 173° C. and substantially free from D. N. R. was obtained in a yield amounting to 82% of the theoretical.

One feature of our improved process for the manufacture of T. N. R. is the ease with which the intermediate D. N. R. may be obtained by the nitrosation of resorcin. Practically quantitative yields result in the nitrosation method described above. However, other suitable methods may be used for preparing the D. N. R., for example that described by Fitz, or a modification thereof such as was published by Orndorff and Nichols in the Journal of the American Chemical Society, vol. 45, pp. 1536–9, 1923. It is generally preferable to utilize freshly prepared D. N. R. for conversion and in the form of a paste containing 40%–70% water. However, the D. N. R. may be utilized in the dry form, if desired, with the obtainment of satisfactory results.

A further simplification of the manufacturing procedure, which may at times prove convenient, results when the nitrosation of resorcin to D. N. R. is effected with the use of nitric acid and sodium nitrite at low temperatures. The resulting D. N. R. may be allowed to settle, and the supernatant reaction or washing liquid removed by decantation or siphoning. Conversion to T. N. R. may then be carried out in the same vessel by heating to the required temperature, adding a suitable amount of nitric acid, and completing the treatment as previously described.

The following method was found sufficiently sensitive for testing T. N. R. for the presence of traces of D. N. R.:

A 0.2 gram sample of T. N. R. is dissolved in 10 c. c. of 10% ammonium acetate solution at 50° C., and one or two drops of a 5% cobaltous nitrate solution then added. The presence of D. N. R. in the T. N. R. is indicated by the development of a pink to a deep reddish-brown color depending on the amount. Quantitative determinations of D. N. R. content may be made by comparison of the color developed in the test sample with those obtained with T. N. R. samples having known D. N. R. contents.

It will be understood that variations from the specific details hereinbefore described may be made without departure from the scope of the invention.

Having now described the invention, what is claimed as new and is desired to be secured by Letters Patent, is:

1. In the manufacture of trinitroresorcin, the process comprising admixing dinitrosoresorcin and a nitric acid solution containing at least five mols of nitric acid per mol of dinitrosoresorcin at an initial temperature that is adjusted in accordance with the acid concentration above a minimum, which varies linearly from 5° C. for 70% acid to 25° C. for 30% acid to 60° C. for 5% acid, and up to 20° C. higher than the said minimum, and completing the reaction at a temperature between 80° C. and the boiling point of the said solution.

2. A process in accordance with claim 1, in which the dinitrosoresorcin is admixed in moist condition.

3. A process in accordance with claim 1, in which the nitric acid solution consists at least in part of recycled reaction liquid.

4. In the manufacture of trinitroresorcin, the process comprising providing a 10%–35% nitric acid solution at a temperature of 50° C. to 80° C., gradually admixing dinitrosoresorcin and sufficient nitric acid to maintain the original acid strength and a reagent ratio of at least 5 mols of nitric acid per mol of dinitrosoresorcin, and completing the treatment at a temperature between 80° C. and the boiling point of the solution.

5. In the manufacture of trinitroresorcin, the process comprising providing an 18% nitric acid solution at a temperature of about 60° C., gradually admixing dinitrosoresorcin and sufficient nitric acid to maintain the acid strength at about 18% and a reagent ratio of at least 5 mols of nitric acid per mol of dinitrosoresorcin, and completing the treatment at about 100° C.

6. As a new product, granular free-flowing trinitroresorcin having a content of a trace to 0.3% dinitrosoresorcin.

7. In the manufacture of trinitroresorcin, the process comprising admixing dinitrosoresorcin and a 40% nitric acid solution in a ratio of at least five mols of nitric acid per mol of dinitrosoresorcin at an initial acid temperature of 30° C. and completing the treatment at about 95° C.

DELBERT R. JONES.
CARL L. ROBERTS.